Feb. 9, 1926.
J. E. MARSDEN
SOLDERING IRON
Filed Feb. 11, 1925
1,572,666
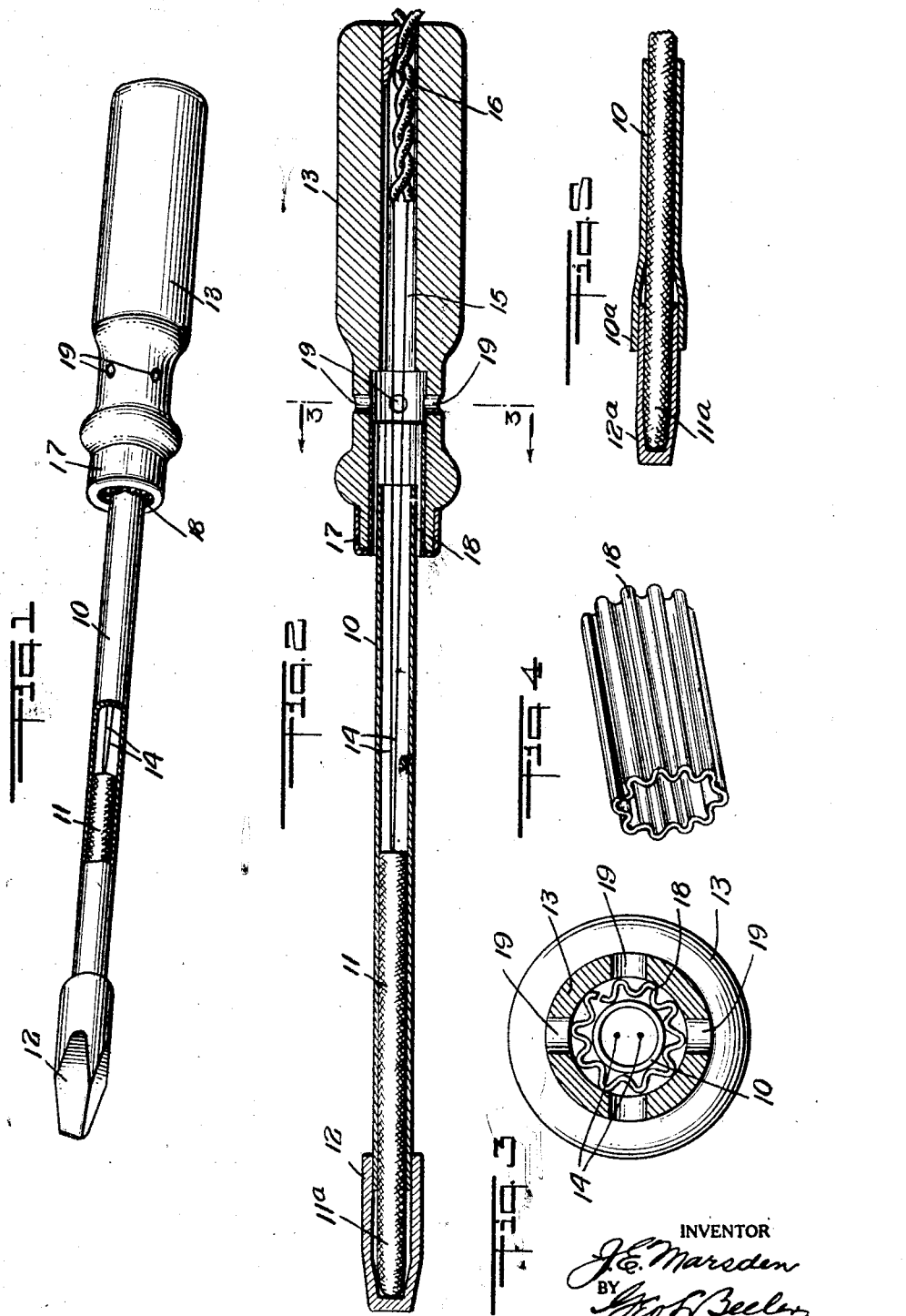
INVENTOR
J. E. Marsden
BY
Geo. F. Beeler
ATTORNEY Patented Feb. 9, 1926.

1,572,666

UNITED STATES PATENT OFFICE.

JOHN E. MARSDEN, OF PHILADELPHIA, PENNSYLVANIA.

SOLDERING IRON.

Application filed February 11, 1925. Serial No. 8,361.

*To all whom it may concern:*

Be it known that I, JOHN E. MARSDEN, a citizen of the United States, residing at Philadelphia, in the county of Philadelphia and State of Pennsylvania, have invented certain new and useful Improvements in Soldering Irons, of which the following is a specification.

This invention relates to metal working tools and has particular reference to soldering irons.

Among the objects of this invention is to provide a soldering iron with a self-contained heating unit adjacent to the point thereof and one that is peculiarly constructed for electric heating purposes.

More specifically, one of my primary objects of the present invention is to provide a soldering iron with a self-contained electric resistance coil for heating the point of the iron and with a peculiarly novel handle structure so arranged as to accommodate the electric wires and to insure that the handle will be kept sufficiently cool for the comfort of the operator's hand.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a perspective diagram showing one form of my device complete.

Fig. 2 is an enlarged longitudinal section of the tool.

Fig. 3 is a transverse sectional detail on the line 3—3 of Fig. 2.

Fig. 4 is a detail perspective of the bushing or sleeve.

Fig. 5 is a fragmentary detail of the point portion of a modification.

Referring now more specifically to the drawings, I show a soldering iron comprising a tubular shank 10 of metal or the like and adapted to carry within it a resistance coil or heating unit 11, the coil being so fitted in the shank as to project somewhat, say a half inch or so, beyond the end of the shank.

The point portion 12 of the tool, made of copper or its equivalent, is fitted upon the outer end of the shank and secured thereto in any suitable manner either frictionally or otherwise, as shown in Figs. 1 and 2, or as shown in Fig. 5, the point 12$^a$ may be fitted within the expanded end 10$^a$ of the shank. In either case the hollow point member and the outer end of the shank are telescoped in attached position. The projected end of the coil 11 is nested within the hollow interior of the point at 11$^a$ in both modifications.

13 indicates a handle through the bore 15 of which the wires 14 from the heating unit 11 extend and lead to any suitable source of energy. At the base of the handle a wedge 16 may be driven to snub or hold the adjacent portion of the wire in fixed position, but a slight air space may be left between the wire and the handle and alongside the wedge.

The neck portion of the handle is reinforced with a ferrule 17, and this part of the handle is counter bored somewhat larger than the shank 10 fitted thereinto, and between the shank and the body of the handle where so reinforced is driven a bushing or sleeve 18 made by crimping or fluting a strip of metal of uniform thickness of stock. This bushing may be made of brass or any other suitable metal of low heat conductivity. The fluting as indicated provides for a certain amount of resiliency incident to the fitting of the shank into the handle, but more particularly, it provides longitudinal parallel air spaces along the grooves both inside and outside of the bushing, one series of spaces being next to the reinforced end of the handle, and the other series being along the shank. The inner or rear end of the bushing lies spaced slightly forward from a series of radial holes 19 bored directly through the handle, whereby a free circulation of air is insured through the handle with the result that the handle and parts associated therewith are maintained safely and comfortably cool.

From the foregoing specific description of the mechanism, its mode of operation and advantage should be apparent. The plug being inserted into any convenient socket, the coil 11 will develop sufficient heat for the usual soldering purposes at the point 12. A considerable portion of this heat will be imparted to the shank, but because of the insulating flexible bushing into which the rear end of the shank is fitted, but a small portion of this heat will be communicated to the handle. Moreover, the circulation of air provided for by the radial holes in the handle will dissipate practically all the heat that would otherwise be transferred to the handle. In both forms of the invention, moreover, it will be appreciated that the end of the coil, being housed directly within the copper tip or point, will heat the same sufficiently with the minimum amount of energy.

I claim:

1. The herein described soldering iron comprising a shank, a point, a handle for the shank arranged to surround a portion thereof and to lie in spaced relation thereto, and a heat insulating member fitted between the shank and the handle to reduce the transfer of heat from the shank to the handle, said insulating member having direct contact with the handle and the shank in said space to support said shank and having grooves running from one end to the other and communicating with the exterior to permit of circulation of air between the shank and the handle and to reduce the transference of heat therebetween.

2. The herein described soldering iron comprising a shank, a point member carried thereby, means extending along the shank to heat the point, a handle for the shank, and a heat insulating bushing fitted between the shank and the handle to reduce the transfer of heat from the shank to the handle, said insulating bushing being in the form of a fluted metal sleeve having grooves inside and outside and split along the side.

In testimony whereof I affix my signature.

JOHN E. MARSDEN.